Patented June 17, 1941

2,246,481

UNITED STATES PATENT OFFICE 2,246,481

HYDROGENATION OF LIGNIN SULPHONIC ACID

Homer Adkins, Madison, and Guy C. Howard, Wausau, Wis., assignors to Marathon Paper Mills Company, Rothschild, Wis., a corporation of Wisconsin No Drawing. Application October 7, 1939, Serial No. 298,466

23 Claims. (Cl. 260—124)

It is known that lignin can be hydrogenated by subjecting it to heat and pressure in an atmosphere of hydrogen. Large amounts of lignin sulphonic acid are available as a by-product of the sulphite pulping process in the form of a dilute solution known as waste sulphite liquor. In addition to the lignin sulphonic acid, this liquor also contains an amount of non-ligneous organic matter approximately equal to its lignin content. Prior to the discovery of the process herein described waste sulphite liquor has been considered to be an uneconomical source of lignin for hydrogenation because of the expense involved in separating the lignin from the water and non-ligneous organic matter. We have discovered a satisfactory process of hydrogenating this lignin material involving a precipitation of the lignin sulphonic acid whereby the lignin substance is obtained substantially free of non-ligneous organic matter and in a form which can be readily dried and then hydrogenating by dissolving it or suspending it in a suitable solvent and heating it under pressure in an atmosphere of hydrogen in presence of catalyst.

While any of the known means of precipitation such as salting out with suitable salts or acids or addition of reagents such as lead acetate or organic amines can be used, we prefer to use the lime precipitation process of Howard United States Patent Reissue No. 18,268 dated December 1, 1931, or Howard United States Patent No. 1,856,558, dated May 3, 1932, in which case the lignin material is obtained as a basic calcium salt of lignin sulphonic acid and is substantially free of non-ligneous organic matter.

The conditions of hydrogenation such as pressure, temperature, solvent, and catalyst may be varied within wide limits depending on the type of products desired. In case high temperatures of the order of 400–600° C. are used a suspension of lignin in a suitable solvent is heated in an atmosphere of hydrogen alone or with catalysts such as compounds of molybdenum or tin. The products of such hydrogenation are largely hydrocarbons and phenols.

In case the material is hydrogenated at lower temperatures such as 200–300° C. the requirements as regards purity of starting material and the catalyst are more exacting. Such hydrogenation of a specially prepared lignin is described by Harris, D'Ianni, and Adkins (Journal Am. Chem. Soc. 60, 1467 (1938)) in which substantially colorless liquid and resinous products are obtained by heating a dioxane solution of their specially prepared lignin at 250–260° C. under 200–350 atmospheres of hydrogen in the presence of copper-chromium oxide catalyst.

It has been believed that lignin sulphonic acid is unsuitable for this type of hydrogenation due to its sulphur content because the catalysts used at this lower temperature, unlike those used at the high temperatures mentioned above, will not promote the desired hydrogenation of organic matter in the presence of organic sulphur compounds. We have found, however, that lignin sulphonic acids and sulphur-containing lignin derivatives can be hydrogenated—even under the mild conditions mentioned above—by a process involving first desulphurizing and then hydrogenating by heating the lignin material in a suitable organic solvent under superatmospheric hydrogen pressure in the presence of a suitable catalyst such as copper-chromium oxide or nickel.

The desulphurizing step may be accomplished either by heating under pressure with lime as described in United States Patent No. 1,848,292 or by cooking with alkali metal hydroxide, precipitating the lignin derivative with acid and removing the precipitate as described in United States Patent Nos. 2,057,117 and 2,104,701 or by heating the lignin sulphonic acid or sulphur-containing lignin derivative under hydrogen pressure in presence of a suitable catalyst such as copper-chromium oxide, nickel, copper, copper oxide, zinc oxide, etc., or by a combination of these methods.

Attention is called to the fact that the process of removing sulphur by heating with hydrogen in presence of a catalyst is the same as that of hydrogenating the lignin and such a desulphurizing step is accompanied by hydrogenation of lignin provided a catalyst such as copper-chromium oxide, suitable for such hydrogenation, is used in an amount in excess of that needed to remove the sulphur. This is especially true if the sulphur content of the lignin starting material is low. Examples 4 and 5 given below describe such single step hydrogenations.

In case the sulphur content is high it is advantageous to carry out the hydrogenation in two or more steps, removing the spent catalyst and adding fresh catalyst between hydrogenations. While copper-chromium oxide catalyst is advantageous for hydrogenation of the lignin, other less expensive catalysts such as nickel, copper oxide and zinc oxide may be used for sulphur removal. Example 2 given below describes the use of nickel for desulphurizing, followed by the use of copper-chromium oxide catalyst for hydrogenating the lignin.

The following are specific embodiments of the invention which illustrate the procedure when using lignin sulphonic acid and some of its derivatives. The copper-chromium oxide catalyst used in these examples is prepared in the following manner:

900 ml. of a solution (at 80°) containing 260 grams of trihydrated copper nitrate and 31 grams of barium nitrate is added to 900 ml. of a solution (at 25°) containing 151 grams of ammonium dichromate and 225 ml. of 28% NH4OH. The precipitate is filtered as dry as possible with suction, dried in an oven at 75–80° for 12 hours, and then ground. The powder is decomposed in a casserole and the heating regulated so that the decomposition does not become too violent. The powder changes from orange to brown and finally to black. At completion the evolution of gases ceases. The cooled powder is leached with 600 ml. of 10% acetic acid, washed free from acid with water, dried in an oven at 125° and pulverized. (Copper-sulphate or sodium dichromate may be used in place of copper nitrate and ammonium dichromate.)

*Example 1*

A 200 cc. portion of a solution consisting of 80 parts dioxane to 20 parts of water and containing 23.2 grams of lignin sulphonic acid was placed in a bomb with 9 grams of copper-chromium oxide catalyst and subjected to a hydrogen pressure of 2,000 lbs. per sq. in. at a room temperature. The bomb was then placed in a shaking device and heated to a temperature of 245° C. during a period of 2 hours and held at a temperature of 240° C. to 245° C. for 2 hours. After cooling and releasing the pressure the catalyst was centrifuged out taking with it some occluded organic matter.

The solution was concentrated by distillation, dry dioxane added, and distillation continued until the temperature rose to 100° C. indicating complete removal of water. The volume of the solution was then 125 ccs. It was then subjected to a treatment similar to above at a starting pressure of 3,000 lbs. per sq. in. and heated 5 hours at 255–260° C. In a third treatment the solution was subjected to a hydrogen pressure of 3,000 lbs. per sq. in. at room temperature with 6 grams of copper-chromium oxide catalyst and was heated to a temperature of 250° C. during 50 minutes and held at a temperature of 250–265° C. and a pressure of 4,800 to 5,150 lbs. per sq. in. for 23 hours. The total cold pressure drop was 490 lbs. per sq. in. indicating an absorption of approximately 1/5 mol. of hydrogen. After removal of the catalyst a practically colorless solution remained.

*Example 2*

A 200 cc. portion of a solution consisting of 80 parts dioxane and 20 parts water and containing 22.9 grams of lignin sulphonic acid was placed in a bomb with about 5 grams of finely divided nickel catalyst and subjected to a hydrogen pressure of 2,000 lbs. per. sq. in. at room temperature. The bomb was then placed in a shaking device and heated to a temperature of 225° C. during a period of 1½ hrs. and held at a temperature of 225° C. to 240° C. for a period of 3 hours. After cooling and releasing the pressure the catalyst was centrifuged out taking with it approximately 5 grams of occluded organic matter.

The solutions from two such desulphurizing treatments were combined and distilled. About 200 cc. dry dioxane was added and the distillation continued until the temperature reached 100° C. indicating complete removal of water. The volume was then 125 cc. This solution was placed in a bomb with 6 grams of copper-chromium oxide catalyst and subjected to a hydrogen pressure of 3,000 lbs. per sq. in., then placed in a shaking device and heated to 265° C. during 55 minutes, and held at a temperature of 265° C. for 22 hours during which time the pressure dropped from 5,800 lbs. per sq. in. to 4,500 lbs. per sq. in., indicating absorption of 1/3 mol. of hydrogen. The total cold pressure drop in three hydrogenations was 1,920 lbs. per sq. in. indicating an absorption of 0.8 mol. hydrogen.

After distilling off the dioxane and such methyl alcohol as formed from the lignin during hydrogenation, there remained 20 grams of hydrogenated lignin substance. When 32 grams of hydrogenated lignin substance obtained in this manner was distilled it yielded 4 grams of a liquid boiling below 130° C. at 1 m.m. and 28 grams of yellow resinous product.

*Example 3*

A 100 cc. portion of a dry dioxane solution containing 12 grams of a partially desulphurized base-free lignin derivative obtained by acidifying a sodium hydroxide solution of lignin sulphonic acid which had been heated under pressure to 180° C. for 30 minutes then extracted with butyl alcohol according to the process of United States Patent No. 2,104,701 was placed in a bomb with 6 grams of copper-chromium oxide catalyst and subjected to a hydrogen pressure of 3,000 lbs. per sq. in. at room temperature. The bomb was then placed in a shaking device and heated to 250° C. during a period of 50 minutes and held at a temperature of 250 to 260° C. for 2 hours. After cooling and releasing the pressure the catalyst was centrifuged out.

The solution was placed in a bomb with 6 grams of copper-chromium oxide catalyst and subjected to a hydrogen pressure of 3,000 lbs. per sq. in. and then placed in a shaking device and heated to 260° C. during 1 hour and held at a temperature of 258° C. to 265° C. for 14 hours during which time the pressure dropped 460 lbs. per sq. in. cold pressure indicating absorption of 0.2 mol. of hydrogen. When no more hydrogen was absorbed the solution was found to be practically colorless.

On distilling off the dioxane 5 grams of a very light yellow resinous material remained.

*Example 4*

In this example a lignin derivative was used which was desulphurized to such an extent that it contained only 0.22% sulphur by cooking the sodium salt of lignin sulphonic acid with caustic soda 2½ hours at 280° C. and 900 lbs. per sq. inch then acidifying with $H_2SO_4$, separating and drying the precipitated lignin derivative. A 100 cc. sample of dry dioxane solution containing 12 grams of this desulphurized lignin derivative was placed in a bomb with 6 grams of copper-chromium oxide catalyst and subjected to 3,000 lbs. per sq. in. hydrogen pressure at room temperature. The bomb was then placed in a shaking device and heated to 260° C. during a period of 50 minutes and held at a temperature of 255° C. to 260° C. for 2 hours during which time the pressure dropped 590 lbs. per sq. in. cold pressure indicating an absorption of 0.25 mol. of hydrogen.

A second treatment with 6 grams fresh catalyst showed absorption of 0.15 mol. of hydrogen while being heated at 255° C. to 260° C. for 7 hours.

On distilling off the dioxane 8.7 grams of a hydrogenated product was obtained.

*Example 5*

In this example a lignin derivative was used which was desulphurized to such an extent that it contained only 0.44% sulphur by heating the basic calcium lignin sulphonic acid described in United States Patent No. Reissue 18,268 containing 15% excess CaO to a temperature of 250° C. for four hours then leaching with sulphurous acid to remove inorganic salts as described in United States Patent No. 1,848,292. A 125 cc. portion of dry dioxane solution containing 17.3 grams of this desulphurized lignin derivative was placed in a bomb with 7 grams of copper-chromium oxide catalyst and subjected to a hydrogen pressure of 3000 lbs. per square inch at room temperature. The bomb was then placed in a shaking device and heated to 267° C. during 55 minutes and held at a temperature of 258° C. to 260° C. for 4 hours during which time the pressure dropped from 5100 to 4800 pounds per square inch indicating an absorption of 0.17 mol. of hydrogen.

A second treatment with 6 grams of copper-chromium oxide showed absorption of 0.14 mol. of hydrogen while being heated at 257 to 260° C. for 5 hours.

A third treatment with 6 grams of copper-chromium oxide showed absorption of 0.14 mol. of hydrogen while being heated at 257 to 265° C. for 16 hours.

At the end of this time the solution was almost colorless. After centrifuging off the catalyst and distilling off the dioxane 9 grams of resinous product remained.

While dioxane is used in all of the above examples we do not wish to limit ourselves to the use of this solvent. The principal requirements for a solvent are that it shall dissolve the lignin substance, shall remain liquid under the temperatures and pressures used, shall not react with hydrogen to give harmful products and shall not render the catalyst inert. In this last connection water miscibility is desirable because many catalysts such as copper-chromium oxide are rendered inert by water. When a water immiscible solvent is used any water formed during the reaction tends to collect on the surface of the catalyst thereby destroying its effectiveness. This does not occur when the solvent used will dissolve water. Some solvents such as dioxane and butyl alcohol have the further desirable properties of forming constant boiling mixtures with water having a boiling point lower than that of the solvent making it easy to dry the solvent.

This property is made use of in Example 1 in which case lignin sulphonic acid is much more soluble in wet than in dry dioxane, but after desulphurizing it is readily soluble in the dry solvent. The desulphurizing is carried out in an 80–20 dioxane water solution. The presence of this amount of water does not interfere with desulphurizing and after desulphurizing the solution can be dried by adding more dry dioxane and distilling out the water as the binary containing 80% dioxane and 20% water by weight, boiling at 83.8° C. In case of butyl alcohol the binary contains 62.7% butyl alcohol and 37.3% water by weight and boils at 92.3° C.

The solubility of the various lignin derivatives in dioxane is in line with the generalizations that solubility in dioxane increases as the sulphur content of the lignin derivative decreases and solubility decreases if the sulphonic or other acid groups are combined in the form of salts. As would be expected the partially desulphurized lignin derivatives when obtained as dry, base-free, or low ash, products dissolve directly in dioxane. In general solubility of the higher sulphur derivatives such as lignin sulphonic acid can be increased by adding some water to dioxane.

While the preparation of dioxane solutions of lignin sulphonic acid is easily accomplished by those acquainted with the peculiarities of the material, certain precautions must be taken to avoid over-heating the dry lignin sulphonic acid and to avoid getting free mineral acid into solution. Such acid would consume the catalyst and corrode the pressure equipment used for desulphonization and hydrogenation.

It is to be understood that the specific examples are given as illustrative embodiments of the invention and that numerous modifications and changes may be made in our process which are intended to be included within the scope of the appended claims.

We claim:

1. The process of producing hydrogenated lignin derivatives which comprises the steps of partially desulphurizing sulphur containing lignin derivatives and then hydrogenating same.

2. The process of producing hydrogenated lignin derivatives which comprises the steps of partially desulphurizing sulphur containing lignin derivatives, dissolving said desulphurized product in an organic solvent and subjecting said solution to hydrogenating conditions.

3. The process of producing hydrogenated lignin derivatives which comprises the steps of partially desulphurizing sulphur containing lignin derivatives, dissolving the desulphurized lignin product in an organic solvent and heating said solution under a hydrogen pressure in the presence of a hydrogenation catalyst.

4. The process of producing hydrogenated derivatives of lignin sulphonic acid compounds which comprises partially desulphurizing a lignin sulphonic acid compound and heating a solution of said desulphurized product under superatmospheric hydrogen pressure in the presence of a hydrogenation catalyst.

5. The process of producing hydrogenated lignin compounds which comprises heating a water and dioxane solution of lignin sulphonic acid under superatmospheric hydrogen pressure in the presence of a hydrogenation metal oxide catalyst in excess of its chemical equivalent of sulphur in the lignin sulphonic acid compounds.

6. The process of producing hydrogenated derivatives of lignin sulphonic acid which comprises treating said lignin sulphonic acid with an alkali under heat and pressure to produce a partially desulphurized product and heating a solution of said desulphurized product under superatmospheric hydrogen pressure in the presence of a hydrogenation catalyst.

7. The process of producing hydrogenated derivatives of lignin sulphonic acid compounds which comprises heating a water and dioxane solution of lignin sulphonic acid under superatmospheric hydrogen pressure in the presence of a nickel catalyst in excess of its chemical equivalent of sulphur in the lignin sulphonic acid compounds.

8. The process of producing hydrogenated derivatives of lignin sulphonic acid compounds which comprises precipitating and separating from waste sulphite liquor lignin sulphonic acid compounds substantially free from non-ligneous organic constituents of such liquor, treating said lignin sulphonic acid compounds under heat and pressure in the presence of an organic solvent, hydrogen and a hydrogenation catalyst to secure hydrogenated derivatives of said lignin sulphonic acid compounds.

9. The process of producing hydrogenated derivatives of lignin sulphonic acid compounds which comprises partially desulphurizing lignin sulphonic acid and heating a solution of said desulphurized product at a temperature of about 200° to about 300° C. under a hydrogen pressure of about 200–300 atmospheres in the presence of a hydrogenation catalyst.

10. The process of producing hydrogenated derivatives of lignin sulphonic acid compounds which comprises heating a water and dioxane solution of lignin sulphonic acid at a temperature of about 200° to about 300° C. under a hydrogen pressure of 200–350 atmospheres in the presence of an amount of copper-chromium oxide hydrogenation catalyst in excess of its chemical equivalent of sulphur in the lignin sulphonic acid compounds.

11. The process of producing hydrogenated derivatives of lignin sulphonic acid which comprises treating lignin sulphonic acid with an alkali under heat and pressure to produce a partially desulphurized product and heating a solution of said desulphurized product at a temperature of about 200° to about 300° C. under a hydrogen pressure of about 200–350 atmospheres in the presence of a hydrogenation catalyst.

12. The process of producing hydrogenated derivatives of lignin sulphonic acid which comprises treating lignin sulphonic acid with calcium hydroxide under heat and pressure to produce a partially desulphurized product and heating a solution of said desulphurized product at a temperature of about 200° to about 300° C. under a hydrogen pressure of about 200–350 atmospheres in the presence of a hydrogenation catalyst.

13. The process of producing hydrogenated derivatives from lignin sulphonic acid which comprises treating lignin sulphonic acid with an alkali metal hydroxide under heat and pressure to produce a partially desulphurized product and heating a solution of said desulphurized product at a temperature of about 200° to about 300° C. under a hydrogen pressure of about 200–350 atmospheres in the presence of a hydrogenation catalyst.

14. The process of producing hydrogenated products from sulphur-containing lignin derivatives which comprises partially desulphurizing sulphur-containing lignin derivatives, dissolving the desulphurized lignin product in a suitable solvent and heating said solution under a hydrogen pressure in the presence of a copper-chromium oxide hydrogenation catalyst.

15. The process of producing hydrogenated products from sulphur-containing lignin derivatives which comprises partially desulphurizing sulphur-containing lignin derivatives, dissolving the desulphurized lignin product in a dioxane solution and heating said solution under a hydrogen pressure in the presence of a hydrogenation catalyst.

16. The process of producing hydrogenated derivatives of sulphur-containing lignin derivatives which comprises partially desulphurizing sulphur-containing lignin derivatives, dissolving the desulphurized lignin product in a dioxane solution and heating said solution under a hydrogen pressure in the presence of a copper-chromium oxide hydrogenation catalyst.

17. The process of producing hydrogenated lignin derivatives which comprises treating waste sulphite liquor with solid phase caustic lime to obtain solid lignin sulphonic acid compounds, separating said solid lignin sulphonic acid compounds from the other constituents of the waste sulphite liquor and treating said lignin sulphonic acid compounds under heat and pressure in the presence of an organic solvent, hydrogen and a hydrogenation catalyst.

18. The process of producing hydrogenated lignin derivatives which comprises treating waste sulphite liquor with solid phase caustic lime to obtain a solid organic product which is separated from the other constituents of the waste sulphite liquor, treating the solid organic product with sulphuric acid to give lignin sulphonic acid, partially desulphurizing said lignin sulphonic acid, heating a solution of said desulphurized product at a temperature of about 200° to about 300° C. under a hydrogen pressure of about 200 to about 300 atmospheres in the presence of a hydrogenation catalyst.

19. The process of producing hydrogenated lignin derivatives which comprises treating waste sulphite liquor with solid phase caustic lime to obtain a solid organic product, and subjecting said solid organic product to a steam pressure cook under conditions of caustic lime alkalinity to reduce its sulphur content and convert it into an acid insoluble product, acidifying the cooked material and washing out the inorganic constituents, heating a solution of said desulphurized product at a temperature of about 200° to about 300° C. under a hydrogen pressure of about 200 to about 300 atmospheres in the presence of a hydrogenation catalyst.

20. The process of producing hydrogenated lignin derivatives which comprises treating waste sulphite liquor with solid phase caustic lime to obtain a solid organic product, partially desulphurizing said product by adding an alkali metal hydroxide and subjecting said mixture to a steam pressure cook until it has been rendered insoluble in dilute acid solution, acidifying and separating the desulphurized precipitated lignin derivative from inorganic compounds, heating a solution of said desulphurized product at a temperature of about 200° to about 300° C. under a hydrogen pressure of about 200–300 atmospheres in the presence of a hydrogenation catalyst.

21. The process of producing hydrogenated products from sulphur-containing lignin derivatives which comprises partially desulphurizing said sulphur-containing lignin derivatives, dissolving the desulphurized lignin product in a solvent selected from the group consisting of dioxane, ethyl alcohol, propyl alcohol and butyl alcohol, and heating said solution under a hydrogen pressure in the presence of a hydrogenation catalyst.

22. The process of producing hydrogenated products from sulphur-containing lignin derivatives which comprises partially desulphurizing said sulphur-containing lignin derivatives, dissolving the desulphurized lignin product in a water miscible organic solvent and heating said solution under a hydrogen pressure, in the presence of a hydrogenation catalyst.

23. The process of producing hydrogenated products from sulphur-containing lignin derivatives which comprises partially desulphurizing by heating a solution of said sulphur-containing lignin derivatives in an organic solvent under hydrogen pressure in the presence of a hydrogenation catalyst selected from the group consisting of copper-chromium oxide, nickel, copper oxide and zinc oxide, and heating a solution of the resulting lignin derivative under hydrogen pressure in the presence of a hydrogenation catalyst.

HOMER ADKINS.
GUY C. HOWARD.